United States Patent
Lassila

(10) Patent No.: US 6,717,019 B2
(45) Date of Patent: Apr. 6, 2004

(54) GLYCIDYL ETHER-CAPPED ACETYLENIC DIOL ETHOXYLATE SURFACTANTS

(75) Inventor: Kevin Rodney Lassila, Macungie, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 153 days.

(21) Appl. No.: 10/060,679

(22) Filed: Jan. 30, 2002

(65) Prior Publication Data

US 2003/0158448 A1 Aug. 21, 2003

(51) Int. Cl.$^7$ ............................................. C07C 43/14
(52) U.S. Cl. ...................... 568/616; 568/623; 568/624; 252/182.11; 252/8.81; 106/287.23; 427/384; 510/421; 510/506
(58) Field of Search ................. 568/616, 623, 568/624; 252/182.11, 8.81; 106/287.23; 427/384; 510/421, 506

(56) References Cited

U.S. PATENT DOCUMENTS

| | | | |
|---|---|---|---|
| 3,268,593 A | 8/1966 | Carpenter et al. | 260/615 |
| 3,293,191 A * | 12/1966 | Carpenter et al. | 568/616 |
| 3,880,766 A * | 4/1975 | Kalopissis et al. | 510/535 |
| 4,117,249 A | 9/1978 | De Simone et al. | 568/855 |
| 5,534,050 A | 7/1996 | Gundlach | 106/20 R |
| 5,650,543 A | 7/1997 | Medina | 568/616 |
| 6,313,182 B1 | 11/2001 | Lassila et al. | 516/204 |

FOREIGN PATENT DOCUMENTS

| | | | |
|---|---|---|---|
| JP | 3063187 | 3/1991 | ............ B41N/3/08 |
| JP | 4071894 | 3/1992 | |
| JP | 4091168 | 3/1992 | ............ C08K/03/36 |
| JP | 6279081 | 10/1994 | ............ C04B/24/02 |
| JP | 2569377 | 8/1996 | ............ B41M/5/26 |
| JP | 2621662 | 6/1997 | ............ B41M/5/26 |
| JP | 9150577 | 6/1997 | ............ B41M/5/26 |
| JP | 2636954 | 8/1997 | ......... C07C/43/178 |
| JP | 00144026 | 5/2000 | ............ C09D/11/00 |
| JP | 2000144026 | 5/2000 | ............ C09D/11/00 |
| WO | WO 9906468 | 2/1999 | ............ C08G/65/26 |

OTHER PUBLICATIONS

European Search Report No. 03001722.1–1214 dated Jun. 24, 2003.
M.W. Leeds et al., I&EC Product Research and Development, "Acetylenic Nonionic Surfactants," pp. 236–242, Central Research Laboratory, Air Reduction Co., Inc. Sept. 1965.

* cited by examiner

*Primary Examiner*—Rosalynd Keys
(74) *Attorney, Agent, or Firm*—Michael Leach

(57) ABSTRACT

The present invention pertains to glycidyl ether-capped acetylenic diol ethoxylates having a structure according to the formula:

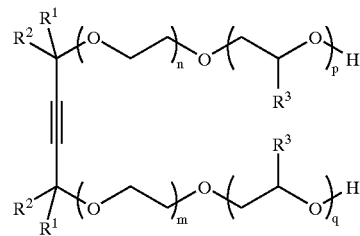

wherein $R^1$ is hydrogen or a linear, branched, or cyclic alkyl group having from 1 to about 6 carbon atoms; $R^2$ is a linear, branched, or cyclic alkyl group having from 1 to about 12 carbon atoms; $R^3$=—$CH_2OR^4$; $R^4$ is a linear, branched, or cyclic alkyl, alkenyl, aryl, or aralkyl group having from 2 to about 30 carbon atoms; (n+m) is from 1 to about 100; and (p+q) is from 0.5 to about 5 and its use to reduce equilibrium and dynamic surface tension in water-based compositions containing an organic or inorganic compound, particularly aqueous organic coating, ink, acid gas scrubbing and agricultural compositions.

38 Claims, No Drawings

GLYCIDYL ETHER-CAPPED ACETYLENIC DIOL ETHOXYLATE SURFACTANTS

FIELD OF THE INVENTION

The invention relates to the use of glycidyl ether-capped acetylenic diol ethoxylates, their manufacture, and their use to reduce surface tension in water-based systems.

BACKGROUND OF THE INVENTION

The ability to reduce the surface tension of water is of great importance in the application of waterborne formulations because decreased surface tension translates to enhanced substrate wetting. Examples of such waterborne compositions include coatings, inks, adhesives, fountain solutions, cleaning compositions and agricultural formulations. Surface tension reduction in water-based systems is generally achieved through the addition of surfactants, resulting in enhanced surface coverage, fewer defects, and more uniform distribution. Equilibrium surface tension performance is important when the system is at rest. Dynamic surface tension provides a measure of the ability of a surfactant to reduce surface tension and provide wetting under high speed application conditions, i.e., high surface creation rates.

Surfactants based on acetylenic glycols such as 2,4,7,9-tetramethyl-5-decyne-4,7-diol (1) and its ethoxylates (2) are known for their good balance of equilibrium and dynamic surface-tension-reducing capabilities with few of the negative features of traditional nonionic and anionic surfactants.

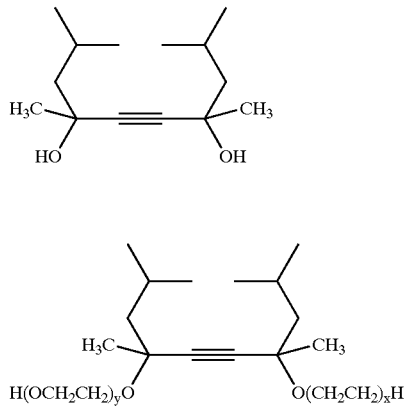

Relative to other families of nonionic surfactants, however, these materials have high critical micelle concentrations, making them less efficient in emulsification and solubilization processes. Acetylenic diols and their ethoxylates are relatively inefficient with respect to surface tension reduction, requiring higher use levels to obtain an equivalent reduction in surface tension. They also have limitations with respect to their effectiveness, that is their ability to reduce the surface tension of a formulation to a low value, regardless of the amount of surfactant used. Finally, acetylenic diol ethoxylates are relatively low foam surfactants, and in many applications, for example cleaning formulations, the formation of foam is desirable from both a performance and aesthetic standpoint.

The importance of a surfactant achieving efficient emulsification and solubilization, and low surface tensions at low use levels, and the ability to control the foam characteristics of a surfactant are of considerable industrial importance and are well appreciated in the art. Extensive discussions of the fundamental properties and practical application of surfactants can be found in Rosen, *Surfactants and Interfacial Phenomena, Second Edition* and in *Kirk Othmer Encyclopedia of Chemical Technology*, Fourth Edition, Volume 23, pp 477–541, which are incorporated by reference.

Many surfactants have the ability to emulsify or solubilize otherwise insoluble organic materials in aqueous media. This emulsification or solubilization generally occurs only at concentrations higher than the critical micelle concentration. It is therefore desirable that surfactants have low critical micelle concentrations, because this will lead to more efficient surfactant utilization [Rosen, p 171ff]. Low critical micelle concentrations are also desirable because they lead to diminished skin and eye irritation.

The ability of a surfactant to reduce the surface tension of an aqueous formulation is important in promoting substrate wetting. Two parameters which are important when evaluating the relative ability of a surfactant to provide surface tension reduction are the efficiency and effectiveness of the surfactant. The efficiency of a surfactant can be defined by its $pC_{20}$ value:

$$pC_{20} = -\log C_{20}$$

where $C_{20}$ is the concentration in moles/liter of surfactant required to reduce the surface tension of water by 20 dynes/cm. $pC_{20}$ provides a means for comparison of the relative amount of surfactant required to obtain a given surface tension reduction. Since the scale is logarithmic, an increase in $pC_{20}$ value of 1 corresponds to a decrease by a factor of 10 in the amount of surfactant required to provide a given surface tension reduction.

The effectiveness of a surfactant can be defined by its limiting surface tension (limiting $\gamma$) which is the minimum surface tension observed for an aqueous solution of the surfactant, regardless of surfactant concentration. Effective surfactants can provide wetting under challenging conditions such as those presented by low energy or contaminated substrates.

The foaming characteristics of a surfactant are important because they can help define applications for which the surfactant might be suitable. For example, foam can be desirable for applications such as ore flotation and cleaning. On the other hand, in coatings, graphic arts and adhesive applications, foam is undesirable because it can complicate application and lead to defect formation.

There are numerous references that disclose alkoxylated acetylenic diols and their uses including: U.S. Pat. Nos. 3,268,593; 4,117,249; 5,650,543; 6,313,182; JP 2636954 B2; JP 2621662 B2; JP 04071894 A; JP 2569377 B2; JP 09150577 A; JP 04091168 A; JP 06279081 A; JP 03063187 A; JP 2000144026 A and Leeds, M. W.; Tedeschi, R. J.; Dumovich, S. J. Casey, A. W. *I&EC Product Research and Development* 1965, 4, 237.

SUMMARY OF THE INVENTION

This invention provides glycidyl ether-capped acetylenic diol ethoxylates which act as surfactants for water-based compositions. The glycidyl ether-capped acetylenic diol ethoxylates have the structure:

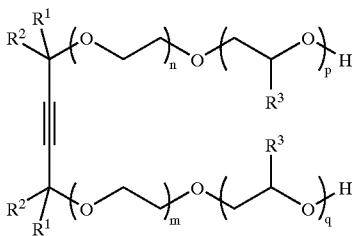

wherein:

$R^1$ is hydrogen or a linear, branched, or cyclic alkyl group having from 1 to about 6 carbon atoms;

$R^2$ is a linear, branched, or cyclic alkyl group having from 1 to about 12 carbon atoms;

$R^3 = \text{—CH}_2\text{OR}^4$;

$R^4$ is a linear, branched, or cyclic alkyl, alkenyl, aryl, or aralkyl group having from 2 to about 30 carbon atoms;

(n+m) is an average value from about 1 to about 100; and (p+q) is an average value from about 0.5 to about 5.

This invention also relates to processes for the manufacture of glycidyl ether-capped acetylenic diol ethoxylates.

Another embodiment of the invention affords water-based compositions containing an organic or inorganic compound, particularly aqueous organic coating, ink, and agricultural compositions, having reduced equilibrium and dynamic surface tension by incorporation of an effective amount of a glycidyl ether-capped acetylenic diol ethoxylates of the above structure.

It is desirable that an aqueous solution of the glycidyl ether-capped acetylenic diol ethoxylates demonstrates a dynamic surface tension of less than 35 dynes/cm at a concentration of $\leq 0.5$ wt % in water at 23° C. and 1 bubble/second according to the maximum bubble pressure method. The maximum bubble pressure method of measuring surface tension is described in Langmuir 1986, 2, 428–432, which is incorporated by reference.

Also provided is a method for lowering the equilibrium and dynamic surface tension of aqueous compositions by the incorporation of these glycidyl ether-capped acetylenic diol ethoxylate compounds.

Also provided is a method for applying a water-based inorganic or organic compound containing composition to a surface to partially or fully coat the surface with the water-based composition, the composition containing an effective amount of a glycidyl ether-capped acetylenic diol ethoxylate compound of the above structure for reducing the dynamic surface tension of the water-based composition.

There are significant advantages associated with the use of these glycidyl ether-capped acetylenic diol ethoxylates in water-based organic coatings, inks, fountain solutions for gravure printing processes, and agricultural compositions and these advantages include: an ability to formulate waterborne compositions which may be applied to a variety of substrates with excellent wetting of substrate surfaces including contaminated and low energy surfaces; an ability to provide a reduction in coating or printing defects such as orange peel and flow/leveling deficiencies; an ability to produce water-borne coatings, fountain solutions and inks which have low volatile organic content, thus making these glycidyl ether-capped acetylenic diol ethoxylate surfactants environmentally favorable; an ability to formulate coating, fountain solution and ink compositions capable of high speed application; and an ability to control the foaming characteristics of the water-based compositions.

Because of their excellent surfactant properties and the ability to control foam, these materials are likely to find use in many applications in which reduction in dynamic and equilibrium surface tension and low foam are important. Such uses include various wet-processing textile operations, such as dyeing of fibers, fiber scouring, and kier boiling, where low-foaming properties would be particularly advantageous. They may also have applicability in soaps, water-based perfumes, shampoos, and various detergents.

A preferred embodiment of the invention comprises an acid gas scrubbing process for the removal of acid gases, i.e., hydrogen sulfide and/or carbon dioxide, from an acid gas-containing gas stream, such as natural and petroleum gases. The acid gas scrubbing, or sweetening, comprises contacting the acid gas-containing gas stream with an aqueous amine solution to adsorb the hydrogen sulfide and/or carbon dioxide, optionally regenerating the aqueous amine solution, and adding a glycidyl ether-capped acetylenic diol ethoxylate according to the invention.

DETAILED DESCRIPTION OF THE INVENTION

This invention relates to acetylenic diol ethoxylates capped with hydrophobic glycidyl ethers, their manufacture, and their use to reduce the surface tension in water-based systems. The novel derivatives of this invention are prepared by reaction of an acetylenic diol ethoxylate with a suitable oxirane-containing compound. The reaction product can be represented by the following structure

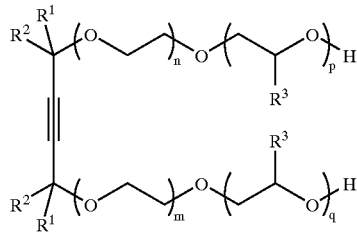

wherein:

$R^1$ is hydrogen or a linear, branched, or cyclic alkyl group having from 1 to about 6 carbon atoms;

$R^2$ is a linear, branched, or cyclic alkyl group having from 1 to about 12 carbon atoms;

$R^3 = \text{—CH}_2\text{OR}^4$;

$R^4$ is a linear, branched, or cyclic alkyl, alkenyl, aryl, or aralkyl group having from 2 to about 30 carbon atoms;

(n+m) is an average value from about 1 to about 100; and (p+q) is an average value from about 0.5 to about 5.

As is well-known, a mixture of isomers will generally be formed because reaction of the ethoxylate with the oxirane-containing material can occur on either an internal carbon or terminal carbon. The selectivity to each isomer will be influenced by the type of catalyst used and the reaction conditions. Thus in many instances a significant, or even major, portion of the reaction product may be comprised of the following isomers:

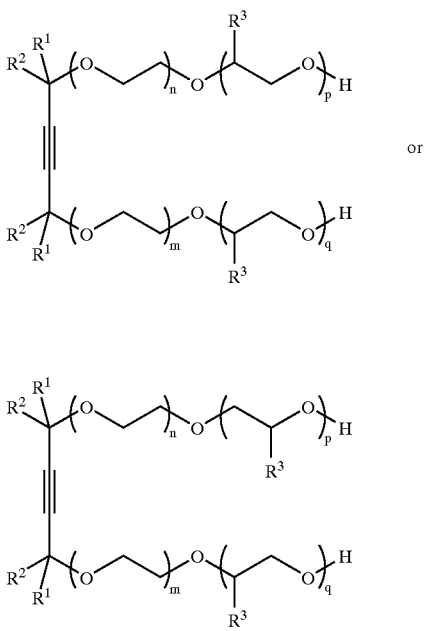

where the R groups have the designations above and the isomeric composition of the p- and q-length oligomeric chains may of course be mixed.

The products are prepared by ethoxylation of an acetylenic diol of the form:

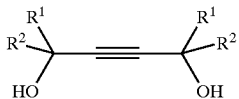

where $R^1$ and $R^2$ are defined as above, followed by adduction with a suitable oxirane-containing material. The preferred acetylenic starting materials are those in which $R^1$ is methyl and $R^2$ is a linear, branched, or cyclic alkyl group having from 3 to about 6 carbon atoms. More preferred acetylenic starting materials are those in which $R^1$ is methyl and $R^2$ is a linear, branched, or cyclic alkyl group having from 4 to 5 carbon atoms, and most preferably $R^2$ is isobutyl or isoamyl.

The amount of ethylene oxide used to prepare the ethoxylated intermediates can vary from 1 mole to about 100 moles. Preferred derivatives will contain from about 1.3 to about 50 moles of ethylene oxide. Most preferred derivatives will contain from about 10 to about 30 moles of ethylene oxide.

Any glycidyl ether, i.e. material of the formula

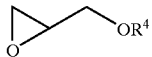

is suitable for use as a capping agent. The amount of glycidyl ether should be from about 0.5 to 5 moles based upon starting acetylenic diol ethoxylate, preferably 1 to 3 moles, and most preferably about 2 moles. The $R^4$ substituent on the glycidyl ether can be a linear, branched, or cyclic alkyl, alkenyl, aryl, or aralkyl group having from 2 to about 30 carbon atoms. Preferably, the $R^4$ substituent is a linear, branched, or cyclic alkyl, alkenyl, aryl, or aralkyl group having from 3 to about 20 carbon atoms, more preferably the $R^4$ substituent has from 4 to about 12 carbon atoms. Examples of suitable glycidyl ethers include ethyl glycidyl ether, butyl glycidyl ether, hexyl glycidyl ether, octyl glycidyl ether, 2-ethylhexyl glycidyl ether, dodecyl glycidyl ether, octadecyl glycidyl ether, phenyl glycidyl ether, cresyl glycidyl ether, and the like. Most especially preferred derivatives are those from butyl glycidyl ether, 2-ethylhexyl glycidyl ether, and dodecyl glycidyl ether.

As set out above, (n+m) is from 1 to about 100. Preferably, (n+m) is from 1.3 to about 50, more preferably (n+m) is from 10 to about 30, and most preferably (n+m) is 10. As set out above, (p+q) is from 0.5 to about 5. Preferably, (p+q) is from about 1 to about 3, and most preferably (p+q) is 2.

To prepare the adducts of the invention, acetylenic diol ethoxylates are adducted with the glycidyl ether in the presence of a suitable catalyst at a temperature sufficiently high so as to provide a convenient reaction rate, and low enough to prevent significant byproduct formation. Reaction temperatures range from about 40 to about 150° C., preferably 50–130° C., and most preferably 60–120° C., although optimal reaction temperatures will depend on the choice of catalyst, reactor configuration, and other variables. The acetylenic diol ethoxylate may be preformed or be made in situ using conventional procedures as disclosed in U.S. Pat. No. 6,313,182 B1. The capping reaction may be performed in the presence of basic catalysts such as alkali metal or alkaline earth hydroxides and tertiary amines, or in the presence of Lewis or Bronsted acid catalysts. Examples of alkali metal and alkaline earth hydroxides include materials such as LiOH, NaOH, KOH, CsOH, FrOH, Be(OH)$_2$, Mg(OH)$_2$, Ca(OH)$_2$, Sr(OH)$_2$ and so on. For commercial production, KOH and NaOH are preferred. Suitable tertiary amine catalysts include trimethylamine, dimethylethylamine, N-methyl-piperidine, pyridine, 4-(N, N-dimethylamino)-pyridine, N,N'-dimethylpiperazine, quinuclidine, 1,4-diazabicyclo[2.2.2]octane, and the like. Trimethylamine is preferred. Examples of Lewis acid catalysts include BCl$_3$, AlCl$_3$, TiCl$_4$, BF$_3$, SnCl$_4$, ZnCl$_2$ and the like. The preferred Lewis acid catalyst is BF$_3$. A sufficient amount of catalyst should be used to provide a convenient reaction rate, but not so much as to impact product purity or complicate post treatment.

When adding glycidyl ethers to the acetylenic glycol and the catalyst, care should be taken to avoid the presence of an excess of unreacted glycidyl ether in the reaction mixture since the reaction is very exothermic and could prove to be very hazardous. The danger of an uncontrollable reaction can be avoided by adding the glycidyl ether in a manner and at a rate such that it reacts as rapidly as it is introduced into the reaction mixture.

The performance properties of these products may be optimized for a specific application by appropriate modification of the alkyl substituents $R^1$ and $R^2$, the degree of ethoxylation (n+m), the degree of adduction (p+q), and the choice of group used as an end cap. The interplay between these factors appears to be complex and is not well-understood. However, it is clear that manipulation of these variables allows access to materials which can perform as emulsifiers or detergents, wetting agents, foaming agents, defoamers, rheology modifiers or associative thickeners, dispersants, and the like. As such, these products will be useful in applications such as coatings, inks, adhesives, agricultural formulations, fountain solutions, photoresist strippers/developers, soaps, shampoos, and other cleaning compositions. They should also find use in oil-field applications such as enhanced oil recovery, fracturing and stimulation processes, and drilling and cementing operations, and in various wet-processing textile operations, such as dyeing of fibers, fiber scouring and kier boiling, and so on.

In another embodiment, the invention relates to an aqueous composition comprising in water an inorganic compound which is a mineral ore or a pigment or an organic compound which is a pigment, a polymerizable monomer, an oligomeric resin, a polymeric resin, a detergent, a herbicide, an insecticide, or a plant growth modifying agent and an effective amount of a glycidyl ether-capped acetylenic diol ethoxylate for reducing the dynamic surface tension of the composition, the glycidyl ether-capped acetylenic diol ethoxylate having a structure according to the formula:

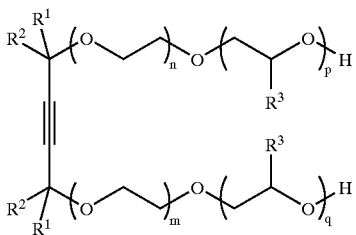

wherein $R^1$, $R^2$, $R^3$, $R^4$, n, m, p, and q are as defined above.

A typical water-based coating composition to which the surfactants of the invention may be added may comprise the following components in an aqueous medium at 30 to 80 wt % solids:

(a) 0 to 50 wt % of a pigment dispersant/grind resin;
(b) 0 to 80 wt % of coloring pigments/extender pigments/anti-corrosive pigments/other pigment types;
(c) 5 to 94.98 wt % of a water-borne/water-dispersible/water-soluble resin;
(d) 0 to 30 wt % of slip additives/antimicrobials/processing aids/defoamers;
(e) 0 to 50 wt % of coalescing or other solvents;
(f) 0.01 to 10 wt % of surfactant/wetting agent/flow and leveling agents; and
(g) 0.01 to 5 wt % of a glycidyl ether-capped acetylenic diol ethoxylate.

A typical water-based ink composition to which the surfactants of the invention may be added comprise the following components in an aqueous medium at 20 to 60 % solids:

(a) 1 to 50 wt % of a pigment;
(b) 0 to 50 wt % of a pigment dispersant/grind resin;
(c) 0 to 50 wt % of a clay base in appropriate resin solution vehicle;
(d) 5 to 93.97 wt % of a water-borne/water-dispersible/water-soluble resin;
(e) 0 to 30 wt % of coalescing solvents;
(f) 0.01 to 10 wt % of a surfactant/wetting agent;
(g) 0.01 to 10 wt % of processing aids/defoamers/solubilizing agents; and
(h) 0.01 to 5 wt % of a glycidyl ether-capped acetylenic diol ethoxylate.

A typical water-based agricultural composition to which the surfactants of the invention may be added may comprise the following components in an aqueous medium at 0.01 to 80 wt % solids:

(a) 0.1 to 50 wt % of a pesticide or plant growth modifying agent;
(b) 0.01 to 10 wt % of a surfactant;
(c) 0 to 5 wt % of dyes;
(d) 0 to 20 wt % of thickeners/stabilizers/co-surfactants/gel inhibitors/defoamers;
(e) 0 to 25 wt % of antifreeze; and
(f) 0.01 to 50 wt % of a glycidyl ether-capped acetylenic diol ethoxylate.

A typical fountain solution composition for planographic printing to which the surfactants of the invention may be added would comprise the following components:

(a) 0.05 to 10 wt % of a film formable, water soluble macromolecule;
(b) 1 to 25 wt % of an alcohol, glycol, or polyol with 2–12 carbon atoms, water soluble or can be made to be water soluble;
(c) 0.01 to 20 wt % of a water soluble organic acid, inorganic acid, or a salt thereof;
(d) 30 to 70 wt % of water; and
(e) 0.01 to 5 wt % of a glycidyl ether-capped acetylenic diol ethoxylate.

A typical water-based photoresist developer or electronic cleaning composition to which the foam controlling agent of the invention may be added would comprise the following components:

(a) 0.1 to 3 wt % tetramethylammonium hydroxide;
(b) 0 to 4 wt % phenolic resin;
(c) 88 to 99.99 wt % water; and
(d) 10–50,000 ppm glycidyl ether-capped acetylenic diol ethoxylate.

A typical acid gas scrubbing composition would comprise in water 10 to 70 wt % of at least one amine, preferably alkanolamine, as is well known in the art and 1 to 500 ppm of a glycidyl ether-capped acetylenic diol ethoxylate.

The present invention can be further illustrated by the following examples of preferred embodiments thereof, although it will be understood that these examples are included merely for purposes of illustration and are not intended to limit the scope of the invention unless otherwise specifically indicated.

EXAMPLES

Examples 1–12 illustrate the preparation of the capped acetylenic diol ethoxylates of the invention. The preparation of the 30 mole ethoxylate of 2,4,7,9-tetramethyl-5-decyne-4,7-diol capped with a $C_{12}$ glycidyl ether will be used for illustration. To a four-necked 2 L round-bottomed flask equipped with a reflux condenser, addition funnel, mechanical stirrer, thermocouple and heating mantle was added the 30 mole ethoxylate of 2,4,7,9-tetramethyl-5-decyne-4,7-diol (Surfynol® 485 surfactant, Air Products and Chemicals, Inc., 825.2 g, 1.0 equiv.). The pot was warmed under nitrogen to 80° C. with stirring. When up to temperature, boron trifluoride diethyl etherate (2.8 mL) was added via syringe. To the reaction mixture was then added a $C_{12}$ glycidyl ether (Epodil® 748 diluent, Air Products and Chemicals, Inc., 717 g, 2.0 equiv.) dropwise over 2.4 hours. The reaction temperature was maintained at 80° C. during the addition. Once the addition was complete the reaction product was cooled to 50° C. with stirring. The boron trifluoride diethyl etherate was removed under vacuum with overnight stirring at 50° C. A golden yellow, medium viscosity liquid was obtained (1535.3 g). Matrix assisted laser desorption/ionization (MALD/I) mass spectral and $^{13}$C nuclear magnetic resonance analyses indicated that the desired adduct had been formed.

Additional capped derivatives of acetylenic diol ethoxylates were prepared and characterized using procedures similar to that above. The materials prepared and their designations are set forth in Table 1.

TABLE 1

Capped Acetylenic Diol Ethoxylates.

| Example | Moles EO | Capping Group | Designation |
|---|---|---|---|
| Example 1 | 30 | LGE | 30/LGE |
| Example 2 | 30 | EHGE | 30/EHGE |
| Example 3 (Comparative) | 30 | None | 30/nil |
| Example 4 | 10 | LGE | 10/LGE |
| Example 5 | 10 | EHGE | 10/EHGE |
| Example 6 (Comparative) | 10 | None | 10/nil |
| Example 7 | 3.5 | LGE | 3.5/LGE |
| Example 8 | 3.5 | EHGE | 3.5/EHGE |
| Example 9 (Comparative) | 3.5 | None | 3.5/nil |

The starting diols used for the preparation of these materials have the following structure:

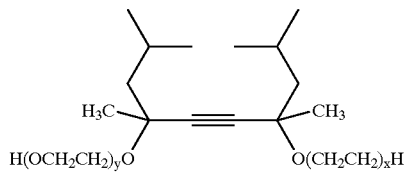

where the ethylene oxide content corresponds to

Surfynol 440 surfactant: x+y=3.5
Surfynol 465 surfactant: x+y=10
Surfynol 485 surfactant: x+y=30

The oxirane-containing starting materials have the following structures and designations:

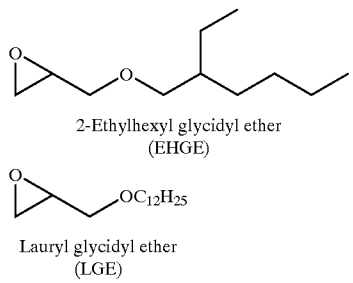

2-Ethylhexyl glycidyl ether (EHGE)

Lauryl glycidyl ether (LGE)

Examples 10–18

Solutions in distilled water of the surfactants of the invention and prior art materials were prepared. Their dynamic surface tensions (γ) were measured (in dyne/cm) using the maximum bubble pressure method, and these data were used to determine the quantities provided in Table 2. The maximum bubble pressure method of measuring surface tension is described in *Langmuir* 1986, 2, 428–432, which is incorporated by reference. These data provide information about the performance of a surfactant at conditions from near-equilibrium (0.1 b/s) through extremely high surface creation rates (20 b/s). In practical terms, high bubble rates correspond to high printing speeds in lithographic printing, high spray or roller velocities in coating applications, and rapid application rates for agricultural products.

The $pD_{20}^{(0.1)}$ value is defined as the negative logarithm of the molar concentration of surfactant required to decrease the surface tension of an aqueous solution to 52.1 dyne/cm, that is, 20 dyne/cm below that of pure water, when the measurement is performed at 0.1 b/s. This value is a measure of the efficiency of a surfactant under dynamic conditions and provides a means for comparing the relative amount of surfactant which would be expected to be required in a composition. An increase of 1 in the $pD_{20}^{(0.1)}$ value means that 10 times less surfactant will be required to provide an equivalent reduction in surface tension at the designated bubble rate.

TABLE 2

Dynamic Surface Tension Data.

| Ex | Compound | $pD_{20}^{(0.1)}$ | CMC* wt % | limiting γ (0.1 b/s) | (20 b/s) | γ (0.1% solution) (1 b/s) | (6 b/s) |
|---|---|---|---|---|---|---|---|
| 10 | 30/LGE | 4.37 | 0.06 | 29.5[a] | 45.8[a] | 41.3 | 49.8 |
| 11 | 30/EHGE | 4.60 | 0.05 | 29.0[a] | 38.3[a] | 32.6 | 45.3 |
| 12-Comp | 30/nil | 3.43 | 2.91 | 35.7[c] | 39.9[c] | 51.5 | 53.2 |
| 13 | 10/LGE | 3.52 | 0.3 | 29.9[a] | 49.5[a] | 54.4 | 62.9 |
| 14 | 10/EHGE | 4.07 | 0.03 | 28.3[a] | 48.5[a] | 33.2 | 53.7 |
| 15-Comp | 10/nil | 3.79 | 0.89 | 29.0[b] | 32.7[b] | 42.5 | 44.8 |
| 16 | 3.5/LGE | 3.78 | 0.06 | 30.7[a] | 45.8[a] | 36.2 | 56.9 |
| 17 | 3.5/EHGE | 3.62 | 0.09 | 31.4[a] | 51.4[a] | 44.3 | 57.9 |
| 18-Comp | 3.5/nil | 3.95 | 0.40 | 27.0[a] | 30.0[a] | 34.3 | 37.0 |

[a]Determined at 0.5 wt %.
[b]Determined at 2.0 wt %.
[c]Determined at 5.0 wt %.

The data in the table show that capping the 30 mole ethoxylate of 2,4,7,9-tetramethyl-5-decyne-4,7-diol (TMDD) with the lauryl and 2-ethylhexyl glycidyl ethers and capping the 10 mole ethoxylate of TMDD with 2-ethylhexyl glycidyl ether resulted in an increase in the dynamic efficiency ($pD_{20}^{(0.1)}$) values. This can be explained on the basis of the increased surface activity imparted by the hydrophobicity of the cap. In contrast, capping the 3.5 mole ethoxylate with either lauryl or 2-ethylhexyl glycidyl ether or the 10 mole ethoxylate with lauryl glycidyl ether resulted in a decrease in dynamic efficiency. This is probably due to the fact that the additional hydrophobicity on these already relatively hydrophobic surfactants adversely impacts the surfactant adsorption dynamics by lowering the critical micelle concentration, and hence the concentration of unaggregated surfactant. This results in a diminution of the diffusive flux of surfactant to newly created interface which is sufficient to overcome the impact of increased surface activity.

Critical micelle concentrations were determined by intersection of the linear portion of a surface tension/ln (concentration) curve with the limiting surface tension as is described in many textbooks. The limiting surface tensions (γ) at 0.1 and 20 bubbles/second (b/s) represent the lowest surface tensions in water which can be achieved at the given surface creation rate for a given surfactant regardless of the amount of surfactant used. The actual concentrations used to determine the limiting surface tension values are provided in the footnotes in the table. These values give information about the relative ability of a surfactant to reduce surface defects under near-equilibrium condition (0.1 b/s) through very dynamic conditions (20 b/s) and provide a comparison of the effectiveness of the surfactants. Lower surface tensions would allow the elimination of defects upon application of a formulation onto lower energy surfaces.

Similarly, the surface tension values at 1 and 6 bubbles per second of 0.1 wt % solutions provide a comparison of the relative efficiencies of the surfactants. These data can be understood using an explanation similar to that provided for the comparison of the $pD_{20}^{(0.1)}$ data above. All of these data show that these novel new materials are both efficient and effective at providing dynamic surface tension reduction, and should therefore have applicability in coatings, inks, adhesives, agricultural formulations, oilfield applications, cleaning products, and the like.

Examples 19–27

The foaming characteristics of these new materials were determined using a simple shake test wherein a 0.1 wt % solution of the surfactant was prepared, the solutions were vigorously shaken manually a total of 10 times, and the time required for the foam to dissipate was recorded. The data are set forth in Table 3.

TABLE 3

Foam Stability Data.

| Example | Compound | t to 0 foam (sec) |
|---|---|---|
| 19 | 30/LGE | >300 |
| 20 | 30/EHGE | 114 |
| 21-Comparative | 30/nil | >300 |
| 22 | 10/LGE | >300 |
| 23 | 10/EHGE | >300 |
| 24-Comparative | 10/nil | >300 |
| 25 | 3.5/LGE | >300 |

TABLE 3-continued

Foam Stability Data.

| Example | Compound | t to 0 foam (sec) |
|---|---|---|
| 26 | 3.5/EHGE | 46 |
| 27-Comparative | 3.5/nil | 24 |

The results show that there is a tendency for increased foam stability the larger the hydrophobic cap (Examples 25–27), although this trend is not evident for the 30 mole ethoxylates (Examples 19–21). Whatever the explanation, the ability to control foam stability characteristics is important in industrial applications. For example, in many cleaning applications, foam is desirable from an aesthetic standpoint. In mining processes such as ore flotation, control of foaming character can enhance the separation and subsequent recovery of ores enriched in a particular mineral. These products will therefore likely see widespread utility in a number of commercial applications.

Other system components can often have an impact on foam stability, and materials which act as foaming agents when by themselves can actually function as defoamers in fully formulated systems.

Examples 28

Equilibrium surface tensions were determined using a Kruss K-12 tensiometer with a platinum Wilhelmy plate, maintaining the temperature at 25±1° C. by means of a constant temperature circulating bath. Results reported are averages of 10 measurements over a 10 minute period having a standard deviation of less than 0.01 dyne/cm. In many instances, the solutions took many hours to reach equilibrium. These data were used to determine critical micelle concentrations, $pC_{20}$ values, and limiting surface tensions. The data are set forth in Table 4.

TABLE 4

Surfactant Data for Capped 30 Mole Ethoxylates.

| | Critical Micelle Concentration | | | |
|---|---|---|---|---|
| Compound | mol/L | wt % | $pC_{20}$ | Limiting γ |
| 30/nil | $1.0 \times 10^{-2}$ | 1.6 | 3.63 | 34.6 |
| 30/EHGE | $1.7 \times 10^{-5}$ | 0.003 | 7.17 | 29.2 |
| 30/LGE | $2.9 \times 10^{-6}$ | 0.0006 | 7.38 | 30.1 |

The results show that addition of the capping group results in a significant decrease in the critical micelle concentrations for these surfactants, and the critical micelle concentration diminishes with the number of carbon atoms present in the hydrophobic cap. This is of practical importance because a reduction in critical micelle concentration generally corresponds to an increase in surfactant efficiency in emulsification and solubilization processes. A lower critical micelle concentration also provides lower skin irritation owing to the fact that irritation properties are associated with the presence of unaggregated surfactant.

The data also show a large increase in $pC_{20}$ values when the surfactants were modified through the addition of a capping group. The $pC_{20}$ value is defined as $$pC_{20} = -\log C_{20}$$

where $C_{20}$ is the concentration in moles/liter of surfactant required to reduce the surface tension of water by 20 dynes/cm. $pC_{20}$ is a measure for the efficiency of adsorption of the surfactant and provides a means for comparison of the relative amount of surfactant which will be required to obtain a given surface tension reduction. Since the scale is logarithmic, an increase in $pC_{20}$ value of 1 corresponds to a decrease by a factor of 10 in the amount of surfactant required to provide a given surface tension reduction. The large increases in $pC_{20}$ values indicate that the capped surfactants enjoy extraordinary increases in efficiency relative to their uncapped counterparts, and the efficiency increases with the amount of carbon present in the cap.

Finally, the last column in the table provides a comparison of the limiting surface tension values (effectiveness) of these materials. It is clear from the data that the addition of the end cap provided significantly lower limiting surface tension values. From a practical standpoint, this means that formulations containing the capped products of the invention would be expected to provide superior wetting on contaminated or low energy substrates relative to their uncapped counterparts. Furthermore, since these very low surface tension values are observed only at concentrations above the critical micelle concentration, these materials provide this improved effectiveness at lower use levels than the compounds of the prior art.

I claim:

1. A glycidyl ether-capped acetylenic diol ethoxylate having the structure:

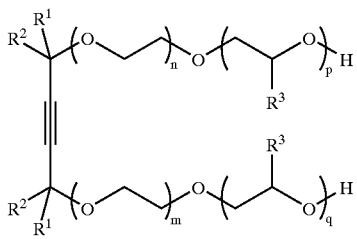

wherein:
$R^1$ is hydrogen or a linear, branched, or cyclic alkyl group having from 1 to 6 carbon atoms;
$R^2$ is a linear, branched, or cyclic alkyl group having from 1 to 12 carbon atoms;
$R^3$=—$CH_2OR^4$;
$R^4$ is a linear, branched, or cyclic alkyl, alkenyl, aryl, or aralkyl group having from 2 to 30 carbon atoms;
(n+m) is an average value from about 1 to about 100; and
(p+q) is an average value from about 0.5 to about 5.

2. The acetylenic diol ethoxylate of claim 1 in which $R^1$ is a methyl group.

3. The acetylenic diol ethoxylate of claim 1 in which $R^2$ is a linear or branched alkyl group having from 3 to 6 carbon atoms.

4. The acetylenic diol ethoxylate of claim 3 in which $R^2$ is an isobutyl or isoamyl group.

5. The acetylenic diol ethoxylate of claim 1 in which $R^4$ is a linear, branched, or cyclic alkyl, alkenyl, aryl, or aralkyl group having from 3 to 20 carbon atoms.

6. The acetylenic diol ethoxylate of claim 5 in which $R^4$ is 2-ethylhexyl.

7. The acetylenic diol ethoxylate of claim 1 in which (n+m) is an average value from 1.3 to about 50.

8. The acetylenic diol ethoxylate of claim 1 in which (p+q) is an average value from 1 to about 3.

9. The acetylenic diol ethoxylate of claim 1 in which (n+m) is an average value from 10 to about 30 and (p+q) is an average value from 1 to about 3.

10. The acetylenic diol ethoxylate of claim 1 in which $R^1$ is methyl; $R^2$ is isobutyl; $R^3$ is $CH_2OR^4$; $R^4$ is 2-ethylhexyl; (n+m) is an average value of about 10; and (p+q) is an average value of about 2.

11. A method for applying a water-based composition to a surface to partially or fully coat the surface, the composition containing an inorganic or organic compound and an effective amount of a surfactant for reducing the dynamic surface tension of the composition, wherein the surfactant is a glycidyl ether-capped acetylenic diol ethoxylate having the structure:

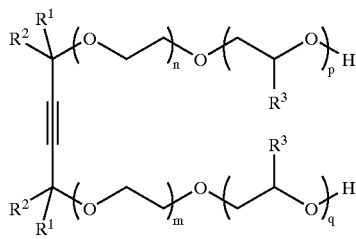

wherein:
$R^1$ is hydrogen or a linear, branched, or cyclic alkyl group having from 1 to 6 carbon atoms;
$R^2$ is a linear, branched, or cyclic alkyl group having from 1 to 12 carbon atoms;
$R^3$=—$CH_2OR^4$;
$R^4$ is a linear, branched, or cyclic alkyl, alkenyl, aryl, or aralkyl group having from 2 to 30 carbon atoms;
(n+m) is an average value from about 1 to about 100; and
(p+q) is an average value from about 0.5 to about 5.

12. The method of claim 11 in which an aqueous solution of the glycidyl ether-capped acetylenic diol ethoxylate demonstrates a dynamic surface tension of less than 35 dynes/cm at a concentration of less than or equal to 0.5 wt % in water at 23° C. and 1 bubble/second according to the maximum bubble pressure method, the ethoxylate at 0.01 to 1 g/100 mL in the water-based composition.

13. The method of claim 11 in which $R^1$ is a methyl group.

14. The method of claim 11 in which $R^2$ is a linear or branched alkyl group having from 3 to 6 carbon atoms.

15. The method of claim 14 in which $R^2$ is an isobutyl or isoamyl group.

16. The method of claim 11 in which $R^4$ is a linear, branched, or cyclic alkyl, alkenyl, aryl, or aralkyl group having from 3 to 20 carbon atoms.

17. The method of claim 16 in which $R^4$ is 2-ethylhexyl.

18. The method of claim 11 in which (n+m) is an average value from 1.3 to about 50.

19. The method of claim 11 in which (p+q) is an average value from 1 to about 3.

20. The method of claim 11 in which (n+m) is an average value from 10 to about 30 and (p+q) is an average value from 1 to about 3.

21. The method of claim 11 in which $R^1$ is methyl; $R^2$ is isobutyl; $R^3$ is $CH_2OR^4$; $R^4$ is 2-ethylhexyl; (n+m) is an average value of about 10; and (p+q) is an average value of about 2.

22. The method of claim 11 which is a process for the removal of hydrogen sulfide and/or carbon dioxide from an acid gas-containing gas stream wherein the gas stream is contacted with an aqueous amine solution to adsorb the hydrogen sulfide and/or carbon dioxide, the aqueous amine solution is optionally regenerated, and the glycidyl ether-capped acetylenic diol ethoxylate is added.

23. An aqueous composition comprising in water an inorganic compound which is a mineral ore or a pigment or an organic compound which is a pigment, a polymerizable monomer, an oligomeric resin, a polymeric resin, a detergent, a herbicide, an insecticide, or a plant growth modifying agent and an effective amount of a glycidyl ether-capped acetylenic diol ethoxylate for reducing the dynamic surface tension of the composition, the glycidyl ether-capped acetylenic diol ethoxylate having a structure according to the formula:

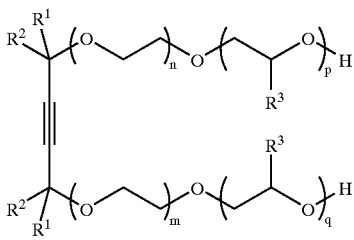

wherein:
$R^1$ is hydrogen or a linear, branched, or cyclic alkyl group having from 1 to 6 carbon atoms;
$R^2$ is a linear, branched, or cyclic alkyl group having from 1 to 12 carbon atoms;
$R^3$=—$CH_2OR^4$;
$R^4$ is a linear, branched, or cyclic alkyl, alkenyl, aryl, or aralkyl group having from 2 to 30 carbon atoms;
(n+m) is from 1 to about 100; and
(p+q) is from 0.5 to about 5.

24. The aqueous composition of claim 23 in which $R^1$ is a methyl group.

25. The aqueous composition of claim 23 in which $R^2$ is a linear or branched alkyl group having from 3 to 6 carbon atoms.

26. The aqueous composition of claim 25 in which $R^2$ is an isobutyl or isoamyl group.

27. The aqueous composition of claim 23 in which $R^4$ is a linear, branched, or cyclic alkyl, alkenyl, aryl, or aralkyl group having from 3 to 20 carbon atoms.

28. The aqueous composition of claim 27 in which $R^4$ is 2-ethylhexyl.

29. The aqueous composition of claim 23 in which (n+m) is from 1.3 to about 50.

30. The aqueous composition of claim 23 in which (p+q) is from 1 to about 3.

31. The aqueous composition of claim 23 in which (n+m) is from 10 to about 30 and (p+q) is from 1 to about 3.

32. The aqueous composition of claim 23 in which $R^1$ is methyl; $R^2$ is isobutyl; $R^3$ is $CH_2OR^4$; $R^4$ is 2-ethylhexyl; (n+m) is 10; and (p+q) is 2.

33. The aqueous composition of claim 23 which is a water-based coating composition having from about 30 wt % to about 80 wt % components, which components comprise:
(a) 0 to 50 wt % of a pigment dispersant/grind resin;
(b) 0 to 80 wt % of coloring pigments/extender pigments/anti-corrosive pigments/other pigment types;
(c) 5 to 94.98 wt % of a water-borne/water-dispersible/water-soluble resins;
(d) 0 to 30 wt % of slip additives/antimicrobials/processing aids/defoamers;
(e) 0 to 50 wt % of coalescing or other solvents;
(f) 0.01 to 10 wt % of surfactant/wetting agent/flow and leveling agents; and
(g) 0.01 to 5 wt % of a glycidyl ether-capped acetylenic diol ethoxylate.

34. The aqueous composition of claim 23 which is a water-based ink composition having from about 20 wt % to about 60 wt % components, which components comprise:
(a) 1 to 50 wt % of a pigment;
(b) 0 to 50 wt % of a pigment dispersant/grind resin;
(c) 0 to 50 wt % of a clay base in appropriate resin solution vehicle;
(d) 5 to 93.97 wt % of a water-borne/water-dispersible/water-soluble resins;
(e) 0 to 30 wt % of coalescing solvents;
(f) 0.01 to 10 wt % of a surfactant/wetting agent;
(g) 0.01 to 10 wt % of processing aids/defoamers/solubilizing agents; and
(h) 0.01 to 5 wt % of a glycidyl ether-capped acetylenic diol ethoxylate.

35. The aqueous composition of claim 23 which is a water-based agricultural composition having from about 0.01 wt % to about 80 wt % components, which components comprise:
(a) 0.1 to 50 wt % of a pesticide or plant growth modifying agent;
(b) 0.01 to 10 wt % of a surfactant;
(c) 0 to 5 wt % of dyes;
(d) 0 to 20 wt % of thickeners/stabilizers/co-surfactants/gel inhibitors/defoamers;
(e) 0 to 25 wt % of antifreeze; and
(f) 0.01 to 50 wt % of a glycidyl ether-capped acetylenic diol ethoxylate.

36. The aqueous composition of claim 23 which is a fountain solution composition for planographic printing having from about 30 wt % to about 80 wt % components, which components comprise:
(a) 0.05 to 10 wt % of a film formable, water soluble macromolecule;
(b) 1 to 25 wt % of an alcohol, glycol, or polyol with 2–12 carbon atoms, water soluble or can be made to be water soluble;
(c) 0.01 to 20 wt % of a water soluble organic acid, inorganic acid, or a salt thereof;
(d) 30 to 70 wt % of water; and
(e) 0.01 to 5 wt % of a glycidyl ether-capped acetylenic diol ethoxylate.

37. The aqueous composition of claim 23 which is a water-based photoresist developer or electronic cleaning composition having components which comprise:
(a) 0.1 to 3 wt % tetramethylammonium hydroxide;
(b) 0 to 4 wt % phenolic resin;
(c) 88 to 99.99 wt % water; and
(d) 10–50,000 ppm of a glycidyl ether-capped acetylenic diol ethoxylate.

38. The composition of claim 23 which is an aqueous acid gas scrubbing composition comprising in water 10 to 70 wt % of at least one amine and 1 to 500 ppm of an alkyl glycidyl ether-capped acetylenic diol ethoxylate.

* * * * *